June 3, 1930. W. W. BLAKELY 1,761,068
WHEEL BLOCK
Filed May 21, 1928
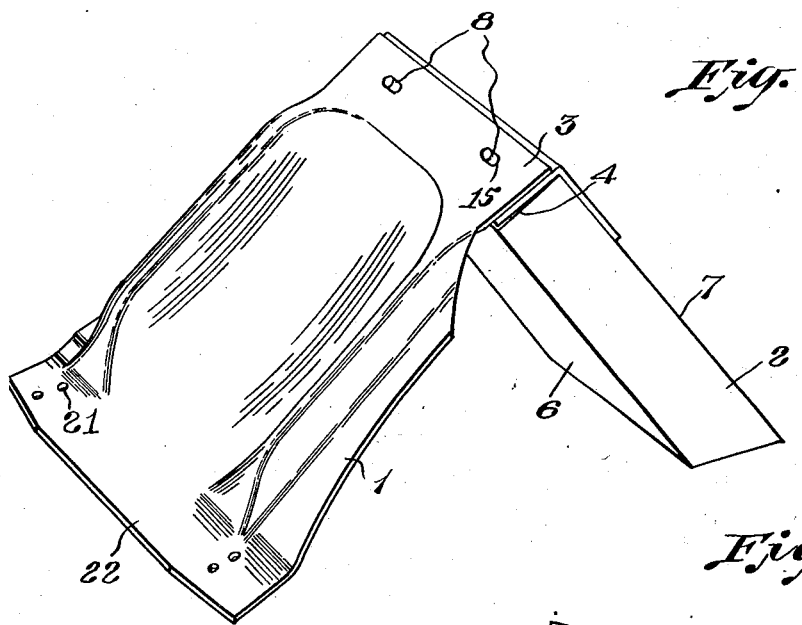
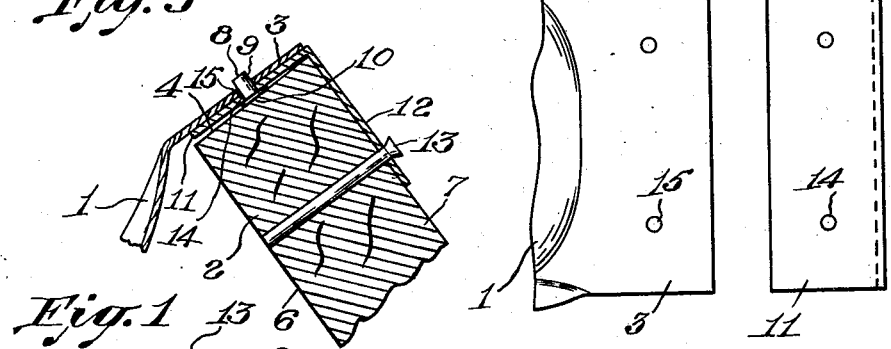
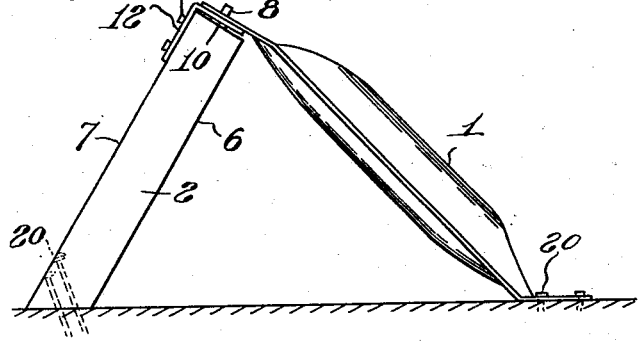
Inventor
William W. Blakely
By Whittemore Hulbert Whittemore & Belknap
Attorneys Patented June 3, 1930

1,761,068

UNITED STATES PATENT OFFICE

WILLIAM W. BLAKELY, OF DETROIT, MICHIGAN

WHEEL BLOCK

Application filed May 21, 1928. Serial No. 279,523.

This invention relates generally to wheel blocks, particularly those designed for holding vehicles against movement within carriers while in transit, and consists of certain novel features of construction, combinations and arrangements of parts as will be more fully described and particularly pointed out in the appended claims.

In the accompanying drawing:

Figure 1 is a side elevation of a wheel block embodying my invention;

Figure 2 is a perspective view thereof.

Figure 3 is a longitudinal vertical sectional view through a portion of the block.

Figure 4 is a detail plan view thereof.

Referring now to the drawings, 1 is a wheel engaging member and 2 is a brace therefor of a wheel block embodying my invention. As shown, the member 1 is constructed of relatively heavy gage sheet metal and is similar in general configuration to the wheel engaging section designated by the numeral 2 in U. S. Patent 1,621,504 dated March 22, 1927, except that in the present instance the flat brace engaging or bearing portion 3 thereof is entirely devoid of depending flanges such as 14 and 15 in the patent. The brace 2 is constructed of wood as in the patent just referred to, but the upper end 4 thereof is disposed at right angles to the flat substantially parallel sides 6 and 7 thereof so as to afford a proper seat for the bearing portion 3 of the wheel engaging member when the parts are assembled and in operative position.

To permit the wheel engaging member and brace to be easily and quickly assembled or taken apart, I have provided upon the flat upper end 4 of the brace a pair of laterally spaced upstanding studs 8 that have substantially cylindrical shanks 9 for interlocking engagement with the flat bearing portion 3 of the wheel engaging member. As shown, the heads 10 of these studs are circular and flat in form and are firmly clamped and retained upon the flat upper end 4 of the brace by means of a lateral flange 11 of a sheet metal plate 12 that in turn is rigidly secured, preferably by nails 13, to the rear face 7 of the brace 2; while the cylindrical shanks 9 of the studs extend through suitable circular openings 14 in the lateral flange 11 and are engageable with suitable laterally spaced circular openings 15 in the flat bearing portion 3 of the wheel engaging member. This lateral flange 11 also serves as a seat for the flat bearing portion 3 of the wheel engaging member when the parts are assembled.

Thus the wheel block formed by the assembly of the parts 1 and 2 is strong and durable, yet may be easily and quickly set up for use. Separate or additional fasteners are therefore not required. Moreover, such blocks may be readily taken apart so that the wheel engaging member and brace may be conveniently returned as separate units to the original shipper for use again. As a result, the trouble and expense of returning bulky or cumbersome blocks such as heretofore have been used has been obviated and the cost of loading and shipping merchandise as automobiles in freight cars or other carriers has accordingly been materially reduced. In use the assembled parts 1 and 2 may be quickly secured to the floor of a carrier by merely driving suitable fasteners such as nails 20 through openings 21 in the forwardly projecting flange 22 of the wheel engaging member and through the wood brace 2 at the lower end thereof.

While it is believed that from the foregoing description, the nature and advantage of my invention will be readily apparent, I desire to have it understood that I do not limit myself to what is herein shown and described and that such changes may be resorted to when desired as fall within the scope of what is claimed.

What I claim as my invention is:

1. In a wheel block, the combination with an inclined wheel engaging member provided at its upper end with a brace engaging portion, and an inclined brace having the upper end thereof constituting a rest for the portion aforesaid of said wheel engaging member, of a separable slot and pin connection between said wheel engaging member and brace.

2. In a wheel block, the combination with an inclined wheel engaging member provided at its upper end with a brace engaging portion, and an inclined brace having the upper end thereof constituting a rest for the portion aforesaid of said wheel engaging member, of a separable connection between said wheel engaging member and brace including studs on the upper end of the brace extending through the brace engaging portion of said wheel engaging member, and retaining means for said studs carried by the brace.

3. In a wheel block, the combination with an inclined wheel engaging member provided at its upper end with a brace engaging portion, and an inclined brace having the upper end thereof constituting a rest for the portion aforesaid of said wheel engaging member, of a separable connection between said wheel engaging member and brace including a pair of laterally spaced studs having the heads thereof on the upper end of the brace and having the shanks thereof extending through the brace engaging portion of said wheel engaging member, and securing means for said studs including a fixed part carried by the brace and sleeved upon the shanks of said studs.

4. In a wheel block, a wheel engaging member having a substantially flat bearing portion, a brace having an end constituting a rest for said bearing portion, and connections between said brace and wheel engaging member including projections rigid with the brace etxending freely through the bearing portion of said wheel engaging member.

5. In a wheel block, a wheel engaging member having a substantially flat bearing portion, a brace having an end constituting a rest for said bearing portion, and connections between said brace and wheel enaging member including studs having heads anchored on the upper end of the brace and having shanks etxending freely through the bearing portions of said wheel engaging member.

6. In a wheel block, a wheel engaging member having a substantially flat bearing portion, a brace having an end constituting a rest for said bearing portion, and connections between said brace and wheel engaging member including a plate secured to one side of the brace and having a lateral flange at one end extending over the upper end of said brace, and studs having portions disposed between said flange and brace end and having other portions extending through said flange and through the bearing portion aforesaid of said wheel engaging member.

In testimony whereof I affixe my signature.

WILLIAM W. BLAKELY.